(12) United States Patent
Huang et al.

(10) Patent No.: US 10,466,265 B2
(45) Date of Patent: Nov. 5, 2019

(54) EDDY CURRENT SENSOR FOR A ROTARY SHAFT AND ROTARY SHAFT APPARATUS

(71) Applicant: Gree Green Refrigeration Technology Center Co., Ltd. of Zhuhai, Zhuhai (CN)

(72) Inventors: Weicai Huang, Zhuhai (CN); Yusheng Hu, Zhuhai (CN); Jiqing Geng, Zhuhai (CN); Zhichang Liu, Zhuhai (CN)

(73) Assignee: Gree Green Refrigeration Technology Center Co., Ltd. of Zhuhai, Zhuhai (CN)

( * ) Notice: Subject to any disclaimer, the term of this patent is extended or adjusted under 35 U.S.C. 154(b) by 0 days.

(21) Appl. No.: 15/539,791

(22) PCT Filed: Aug. 31, 2015

(86) PCT No.: PCT/CN2015/088665
§ 371 (c)(1),
(2) Date: Jun. 26, 2017

(87) PCT Pub. No.: WO2016/127627
PCT Pub. Date: Aug. 18, 2016

(65) Prior Publication Data
US 2017/0370958 A1    Dec. 28, 2017

(30) Foreign Application Priority Data

Feb. 12, 2015  (CN) .......................... 2015 1 0076548

(51) Int. Cl.
*G01P 3/495*   (2006.01)
*F16C 3/02*    (2006.01)
(Continued)

(52) U.S. Cl.
CPC ................ *G01P 3/495* (2013.01); *F16C 3/02* (2013.01); *G01B 7/003* (2013.01); *G01P 3/484* (2013.01);
(Continued)

(58) Field of Classification Search
CPC .... G01D 5/145; G01D 11/245; G01D 5/2451; G01D 5/00; G01D 5/14; G01P 3/487; G01B 7/023; G01B 7/02
See application file for complete search history.

(56) References Cited

U.S. PATENT DOCUMENTS 5,696,444 A * 12/1997 Kipp ................... F04D 15/0088
                                                        324/207.16
7,633,201 B2  12/2009 Buhler et al.
(Continued)

FOREIGN PATENT DOCUMENTS

CN       1800773 A      7/2006
CN     103472247 A     12/2013
(Continued)

*Primary Examiner* — Jermele M Hollington
*Assistant Examiner* — Suresh K Rajaputra
(74) *Attorney, Agent, or Firm* — The Webb Law Firm

(57) ABSTRACT

An eddy current sensor for a rotary shaft and a rotary shaft apparatus. The eddy current sensor includes: a housing; one or more position detecting probes provided on the housing; and a rotating speed detecting probe provided on the housing. The eddy current sensor integrates the position detecting probe and the rotary speed detecting probe, such that while the eddy current sensor is detecting position displacement of the rotary shaft, the eddy current sensor may also simultaneously detect the rotating speed of the rotary shaft, which facilitates detecting and monitoring the rotary shaft more comprehensively. The detected position data and rotating
(Continued)

speed data of the rotary shaft correspond to each other at any time, such that the working state of the rotary shaft may be analyzed more intensively.

13 Claims, 3 Drawing Sheets

(51) Int. Cl.
*G01B 7/00* (2006.01)
*G01P 3/484* (2006.01)
*G01P 15/00* (2006.01)
*G01P 3/488* (2006.01)
*G01P 3/49* (2006.01)
*G01D 5/14* (2006.01)
*G01D 5/20* (2006.01)
*G01B 7/30* (2006.01)

(52) U.S. Cl.
CPC ............... *G01P 3/488* (2013.01); *G01P 3/49* (2013.01); *G01P 15/005* (2013.01); *G01B 7/30* (2013.01); *G01D 5/147* (2013.01); *G01D 5/2046* (2013.01)

(56) References Cited

U.S. PATENT DOCUMENTS

| 2003/0227286 | A1 | 12/2003 | Dunisch et al. |
| 2008/0111541 | A1* | 5/2008 | Miller ................ G01D 5/14 324/207.16 |
| 2009/0102467 | A1* | 4/2009 | Snell ................ G01D 5/145 324/207.25 |
| 2017/0022988 | A1 | 1/2017 | Huang et al. |
| 2017/0030355 | A1 | 2/2017 | Huang et al. |
| 2017/0211948 | A1* | 7/2017 | Hu ................ G01B 7/023 |

FOREIGN PATENT DOCUMENTS

| CN | 203615907 U | 5/2014 |
| CN | 103953544 A | 7/2014 |
| CN | 103953545 A | 7/2014 |
| CN | 104101372 A | 10/2014 |
| CN | 204212984 U | 3/2015 |
| CN | 204388770 U | 6/2015 |
| EP | 0816685 A1 | 1/1998 |
| EP | 1668252 | 6/2006 |
| JP | 2000205259 A | 7/2000 |
| JP | 200182345 A | 3/2001 |
| JP | 2005282647 A | 10/2005 |

* cited by examiner

EDDY CURRENT SENSOR FOR A ROTARY SHAFT AND ROTARY SHAFT APPARATUS

CROSS-REFERENCE TO RELATED APPLICATIONS

This application is the United States national phase of International Application No. PCT/CN2015/088665 filed Aug. 31, 2015, and claims priority to Chinese Patent Application No. 201510076548.9 filed Feb. 12, 2015, the disclosures of which are hereby incorporated in their entirety by reference.

FIELD OF THE INVENTION

The present application relates to the field of a rotary shaft apparatus, and more particularly, to an eddy current sensor and a rotary shaft apparatus.

BACKGROUND OF THE INVENTION

A maglev motor bears a rotary shaft using a maglev technology. This is why it can implement an extremely high rotating speed while the rotary shaft can rotate more stably. However, because the rotary shaft has a high rotation speed, a contact type detecting device will not be applicable for detecting a maglev rotary shaft.

Conventionally, an eddy current sensor is employed to perform position detection of the maglev rotary shaft. The detection is mainly directed to endplay of the rotary shaft for monitoring a working state of the rotary shaft. However, conventional integrated eddy current displacement sensors currently available in the market do not have a rotating speed testing function, such that the rotating speed of a maglev motor rotary shaft cannot be accurately obtained, which does not facilitate overall monitoring and real-time controlling of the rotating speed of the maglev motor.

SUMMARY OF THE INVENTION

An objective of the present application is to provide an eddy current sensor for a rotary shaft, solving the problem of the rotation speed of the rotary shaft which fails to be detected by an eddy current sensor in the prior art.

According to an aspect of the present application, there is provided an eddy current sensor for a rotary shaft, comprising: a housing; one or more position detecting probes provided on the housing; and a rotating speed detecting probe provided on the housing.

Further, the housing comprises a central hole for the rotary shaft to pass through, the detecting end of the rotating speed detecting probe being oriented parallel or perpendicular to an axial direction of the central hole.

Further, the housing comprises: an inner ring portion, a center of which forms a central hole for the rotary shaft to pass through; a middle portion connected to an exterior wall of the inner ring portion and extending outwardly; and the position detecting probes provided on the inner ring portion and/or the middle portion.

Further, the rotating speed detecting probe is provided on the inner ring portion, and the detecting end of rotating speed probe being oriented perpendicular to the axial direction of the central hole.

Further, the housing further comprises an outer ring portion, the middle portion being disposed between the inner ring portion and the outer ring portion and forming a recessed structure, the rotating speed detecting probe being provided on the outer ring portion, and the detecting end of the rotating speed detecting probe being oriented parallel to the axial direction of the central hole.

Further, the outer ring portion is opened with a mounting hole for mounting the rotating speed detecting probe, and the detecting end of the rotating speed detecting probe is flush with an end of the housing.

Further, on a peripheral direction of the housing, a length of an arc between the rotating speed detection probe and a position detecting probe adjacent to its left side is equal to that of an arc between the rotating speed detecting probe and a position detecting probe adjacent to its right side.

Further, the position detecting probes include one or more radial probes that are provided on the inner ring portion, and detecting ends of the radial probes being oriented perpendicular to an axial direction of the central hole.

Further, the housing further comprises an outer ring portion, the middle portion being disposed between the inner ring portion and the outer ring portion to form a recessed structure, on the outer ring portion being provided with one or more radial holes being provided in one-to-one correspondence with the radial probes.

Further, the position detecting probes comprise one or more axial probes that are provided on the middle portion, and detecting ends of the axial probes being oriented parallel to the axial direction of the central hole.

Further, the eddy current sensor further comprises a compensating probe disposed on the housing.

Another aspect of the present application relates to a rotary shaft apparatus, comprising a rotary shaft having the eddy current sensor, a housing of the eddy current sensor being disposed around the rotary shaft; one or more rotating speed detection exciting portion being provided on the rotary shaft; a rotating speed detecting probe of the eddy current sensor being provided in correspondence to a revolving plane of the rotating speed detection exciting portion.

Further, the rotating speed detecting and exciting portion is provided on a peripheral outer surface of the rotary shaft, the detecting end of the rotating speed detecting probe being oriented perpendicular to the axial direction of the rotary shaft.

Further, the rotary shaft comprises a flange, the rotating speed detection exciting portion being provided on an axial end of the flange, the detecting end of the rotating speed detecting probe being oriented parallel to the axial direction of the rotary shaft.

By applying the technical solution of the present application, the eddy current sensor integrates the position detecting probe and the rotary speed detecting probe, such that while the eddy current sensor is detecting position displacement of the rotary shaft, it may also simultaneously detect the rotating speed of the rotary shaft, which facilitates detecting and monitoring the rotary shaft more comprehensively; besides, the detected position data and rotating speed data of the rotary shaft are corresponding to each other at any time, such that the working state of the rotary shaft may be analyzed more intensively.

BRIEF DESCRIPTION OF THE ACCOMPANYING DRAWINGS

The accompanying drawings, which constitute a part of the present application, are to provide a further understanding of the present application. Illustrative embodiments of the present application and depictions thereof are intended to explain the present application, not for improperly limiting the present application. In the drawings.

Figure 1:
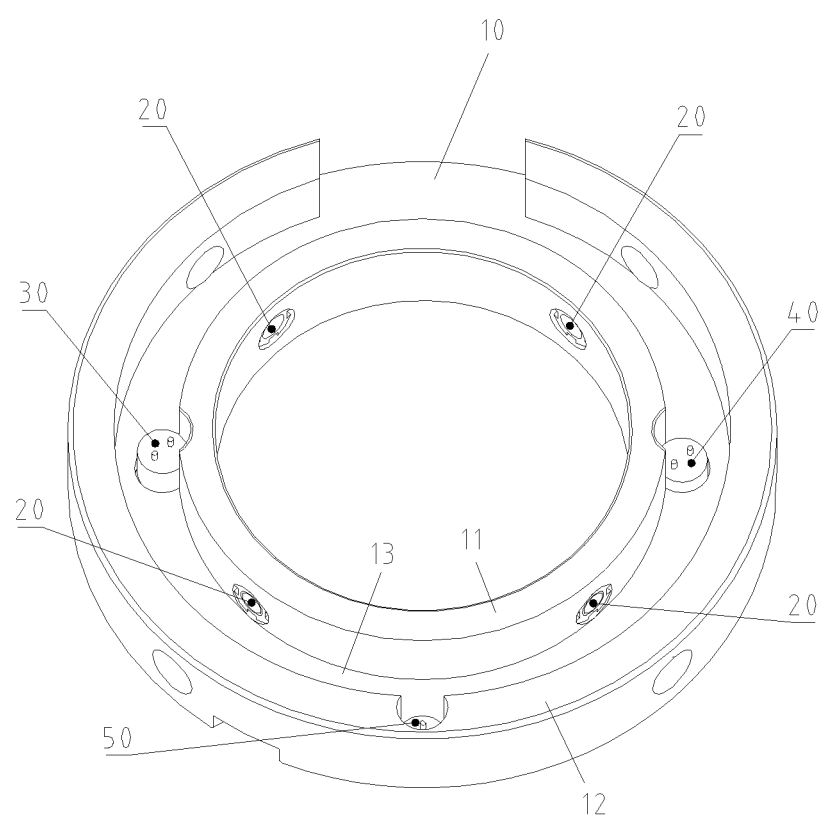
FIG. 1 is a schematic diagram illustrating a mounting relationship between a housing and probes of an eddy current sensor according to the present application.

Reference numerals in the drawings: 10. Housing; 20. Radial probe; 30. Axial probe; 40. Compensation probe; 50. Rotating speed detecting probe; 60. Filler element; 11. Inner ring portion; 12. Outer ring portion; 13. Middle portion; 100. Rotary shaft; 110. Flange; 111. Rotary speed detecting and exciting part.

DETAILED DESCRIPTION OF THE PREFERRED EMBODIMENTS

It is to be noted that the features in the embodiments and examples in the present application may be combined with each other without conflict. Hereinafter, the present application will be described in detail with reference to the accompanying drawings.

Figure 2:
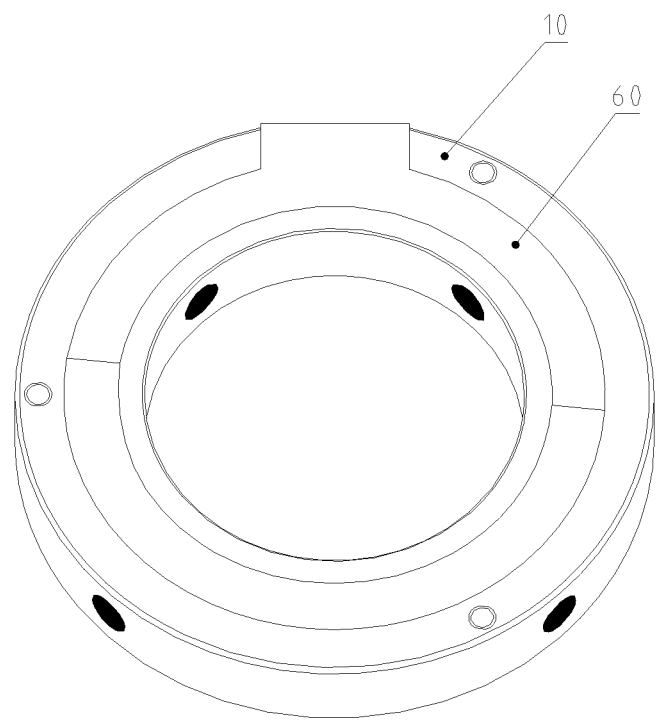
FIG. 2 is a stereoscopic diagram of an eddy current sensor according to the present application.
Figure 3:
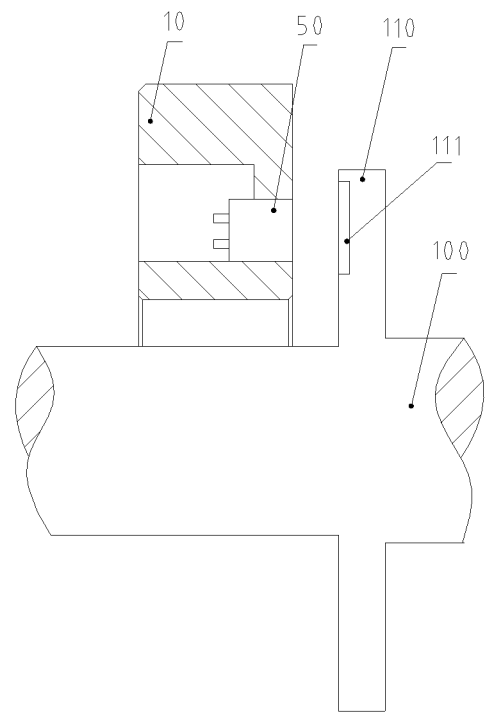
FIG. 3 is a schematic diagram illustrating a positional relationship between a rotary shaft of an eddy current sensor of a rotary shaft apparatus according to the present application.

According to one aspect of the present application, there is provided an eddy current sensor for a rotary shaft. As shown in FIGS. 1-3, the eddy current sensor comprises: a housing 10; one or more position detecting probes disposed on the housing 10; and a rotating speed detecting probe 50 disposed on the housing 10.

The depiction above shows that the eddy current sensor of the present application integrates the position detecting probe and the rotary speed detecting probe, such that while the eddy current sensor is detecting the position displacement of the rotary shaft, it may also simultaneously detect the rotating speed of the rotary shaft, which facilitates detecting and monitoring the rotary shaft 100 more comprehensively; besides, the detected position data and rotating speed data of the rotary shaft are corresponding to each other at any time, such that the working state of the rotary shaft 100 may be analyzed more intensively.

Preferably, the housing 10 is made of a weak magnetic material, for example, an aluminum alloy, a stainless steel, etc., which can effectively reduce interference of a strong magnetic metal housing with a probe vortex field, thereby enhancing testing precision.

Preferably, the housing 10 comprises a central hole for the rotary shaft 100 to pass through, a detecting end of the rotating speed detecting probe 50 being oriented parallel or perpendicular to an axial direction of the central hole. FIGS. 1-4 show an embodiment in which the detecting end of the rotary speed detecting probe 50 is oriented parallel to the axial direction of the central hole. However, the present application does not limit the orientation of the detecting end of the rotating speed detecting probe 50, which only requires that the detecting end is disposed in corresponding to the rotating speed detecting and exciting part 111 on the rotary shaft 100.

Preferably, as shown in FIG. 1, the housing 10 comprises: an inner ring portion 11, a center of which forms a central hole for the rotary shaft 100 to pass through; a middle portion 13 connected to an exterior wall of the inner ring and extending towards an outer side; and a position detecting probe disposed on the inner ring portion 11 and/or the middle portion 13. The inner ring portion 11 is mainly provided with a position detecting probe whose detecting end is oriented perpendicular to an axial direction, while the middle portion 13 is mainly provided with a position detecting probe whose detecting end is oriented parallel to the axial direction.

Preferably, the rotating speed detecting probe 50 is provided on the inner ring portion 11, and the detecting end of the rotating speed probe 50 being oriented perpendicular to the axial direction of the central hole. This embodiment is not illustrated in the drawings. Correspondingly, the rotating speed detecting and exciting part 111 corresponding to the rotating speed detecting probe 50 is disposed on a peripheral outer surface of the rotary shaft 100.

Alternatively, the housing 10 further comprises an outer ring portion 12. The middle portion 13 is disposed between the inner ring portion 11 and the outer ring portion 12 and forms a recessed structure. The rotating speed detecting probe 50 is provided on the outer ring portion 12, and the detecting end of the rotating speed detecting probe 50 is oriented parallel to the axial direction of the central hole, i.e., the embodiment shown in FIGS. 1-4. Such an arrangement has an advantage that the rotating speed detecting probe 50 is further from the axle center of the rotary shaft 100, and the rotating radium of the rotating speed detection exciting portion 111 is longer; therefore, the longer the arc length between neighboring rotating speed detection exciting portions 111, the higher the detection precision of the rotating speed detecting probe 50 is.

Preferably, as illustrated in FIG. 3, the outer ring portion 12 is opened with a mounting hole for mounting a rotating speed detecting probe 50. The detecting end of the rotating speed detecting probe 50 is flush with an end face of the housing 10. The rotating speed detecting probe 50 may employ a Hall effect, an eddy current effect or a photosensitive effect to generate an inductance with the rotating speed detection exciting portion 111; in this way, the closer the rotating speed detecting probe 50 is to the rotary speed detection exciting portion 111, the higher the detection precision is.

Preferably, on a peripheral direction of the housing 10, the length of an arc between the rotating speed detection probe 50 and the position detecting probe adjacent to its left side is equal to that of an arc between the rotating speed detecting probe 50 and the position detecting probe adjacent to its right side. In order to avoid mutual interference between the rotating speed detecting probe 50 and the position detecting probe, the distance between the probes is set as large as possible. It is an optimal design to evenly distribute respective probes along a peripheral direction.

Preferably, as illustrated in FIG. 1, the plurality of position detecting probes include: one or more radial probes 20 that are provided on the inner ring portion 11, detecting ends of the radial probes 20 being oriented perpendicular to an axial direction of the central hole. The embodiment in FIG. 1 comprises four radial probes 20 that are evenly distributed along a periphery. In this way, radial endplay of the rotary shaft 100 can be detected precisely in two mutually orthogonal directions. It should be particularly noted that if the position detecting probes only include two radial probes 20, the connecting line between the two radial probes 20 does not pass through the central axis of the rotating shaft 100, i.e., the two radial probes 20 are angled with the connecting line of the central axis, preferably in 90°.

More preferably, the housing 10 further comprises an outer ring portion 12. The middle portion 13 is disposed between the inner ring portion 11 and the outer ring portion 12 and forms a recessed structure. There are one or more radial holes on the outer ring portion 12, which are provided in one-to-one correspondence with the radial probes 20.

More preferably, the plurality of position detecting probes comprise: one or more axial probes 30 that are provided on the middle portion 13, detecting ends of the axial probes 30 being oriented parallel to the axial direction of the central hole. The axial probes 30 are adapted to detect axial endplay of the rotary shaft 100. In the embodiment shown in FIG. 1, the axial probe 30 is provided a center of the arc length between adjacent two radial probes 20.

Preferably, the eddy current sensor further comprises a compensating probe 40 disposed on the housing. The compensation probe 40 is disposed on the housing 10. The compensation probe 40 is mainly for detecting impacts of the external environment on the eddy current sensor, e.g., temperature impact, humidity impact, and external force deformation impact; and compensating for the detected data by other probes through the detected data, thereby forming a closed-loop or semi-closed loop feedback system and enhancing detecting precision of the eddy current sensor. Because the compensating probe 40 does not directly detect the rotary shaft 100, the compensating probe 40 may be a contact type probe, or a non-contact type probe, e.g., an eddy current probe.

Preferably, the compensating probe 40 is disposed at the center of the arc length of the two adjacent radial probes 20. More preferably, the compensating probe 40 and the axial probe 30 are oppositely provided, which are centrosymmetric; in this way, the distance between the probes may be set in maximum.

Preferably, as shown in FIG. 1, the eddy current sensor further comprises a filler element 60 that fills interstices within the housing 10 to form a solid annular cylindrical body. Preferably, the housing 10 and the probes may be plastically sealed. Because the interstices within the housing 10 is filled with the filler element 60, the probes may be fixed within the housing 10, which ensures mounting stability of the probes and guarantees detection stability of the eddy current sensor. Preferably, the filler element 60 is made of plastics. The internal air within the housing 10 and respective welding spots on the probes are integrally potted with plastics in molds. It may fully fill all interstices within the housing 10 by potting, thereby enhancing use reliability of the eddy current sensor. Because the housing 10, respective probes, cables, and junctions of the plastically sealed eddy current sensor are integrated, testing stability, signal transmission stability, and service life of the eddy current sensor will be enhanced.

Figure 4:
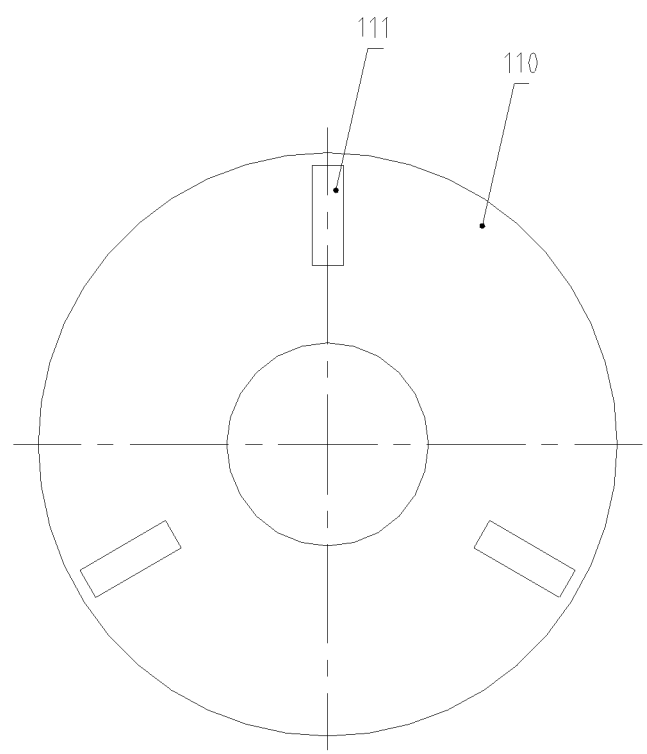
FIG. 4 is a schematic diagram illustrating a positional relationship of a rotating speed detecting and exciting part of a rotary shaft of the rotary shaft apparatus of the present application.

According to another aspect of the present application, there is provided a rotary shaft apparatus, as shown in FIGS. 3 and 4, comprising a rotary shaft 100 and an eddy current sensor indicated above, a housing 10 of the eddy current sensor being disposed around the rotary shaft 100; one or more rotating speed detection exciting portion 111 being provided on the rotary shaft 100; a rotating speed detecting probe 50 of the eddy current sensor being provided in correspondence to a revolving plane of the rotating speed detection exciting portion 111.

The rotating speed detection exciting portion 111 and the rotating speed detecting probe 50 form a feedback, e.g., a magnetic feedback or an optical feedback, such that each time the rotating speed detection exciting portion 111 passes through the rotating speed detecting probe 50, excitation is formed to the rotating speed detecting probe 50, such that the rotating speed detecting probe 50 outputs a pulse-like waveform, thereby implementing counting and further obtaining the rotating speed data of the rotary shaft 100.

It should be particularly noted that the number of the rotating speed detecting part 111 is preferably in plurality, more preferably greater than or equal to 3, which are evenly distributed so as to reduce impacts of the formed rotating load to the rotary shaft 100.

Preferably, when the rotating speed detecting probe 50 is an eddy current probe, the rotating speed detection exciting portion 111 may be simply a recess or bump.

Preferably, the rotating speed detection exciting portion 111 is provided on a peripheral outer surface of the rotary shaft 100, a detecting end of the rotating speed detecting probe 50 being oriented perpendicular to the axial direction of the rotary shaft 100. This embodiment is not shown in the drawings, details of which may refer to the depictions above.

Alternatively, as shown in FIG. 4, the rotary shaft 100 comprises a flange 110, the rotating speed detection exciting portion 111 being provided on an axial end face of the flange 110, the detecting end of the rotating speed detecting probe 50 being oriented parallel to the axial direction of the rotary shaft 100.

What have been discussed above are only preferred embodiments of the present application, not for limiting the present application. For those skilled in the art, the present application may have various changes and variations. Any modification, equivalent replacement, improvement within the principle and spirit of the present application should be included within the protection scope of the present application.

The invention claimed is:

1. An eddy current sensor for a rotary shaft, comprising:
a housing;
one or more position detecting probes provided on the housing;
a rotating speed detecting probe provided on the housing; and
a filler element filling interstices within the housing to form a solid annular cylindrical body, such that the position detecting probes and the rotating speed detecting probe are plastically sealed together with the housing;
wherein the housing comprises:
an inner ring portion, a center of which forms a central hole for the rotary shaft to pass through;
a middle portion connected to an exterior wall of the inner ring portion and extending outwardly;
an outer ring portion connected to an end away from the inner ring of the middle portion and forming a recessed structure with the inner ring portion and the middle portion;
wherein the position detecting probes being provided on the inner ring portion and/or the middle portion, the rotating speed detecting probe being provided on the inner ring portion or the outer ring portion.

2. The eddy current sensor for a rotary shaft according to claim 1, wherein the housing comprises a central hole for the rotary shaft to pass through, a detecting end of the rotating speed detecting probe being oriented parallel or perpendicular to an axial direction of the central hole.

3. The eddy current sensor for a rotary shaft according to claim 1, wherein the rotating speed detecting probe is provided on the inner ring portion, and wherein a detecting end of the rotating speed detection probe is oriented perpendicular to an axial direction of the central hole.

4. The eddy current sensor for a rotary shaft according to claim 1, wherein the rotating speed detecting probe being provided on the outer ring portion, and a detecting end of the rotating speed detecting probe being oriented parallel to an axial direction of the central hole.

5. The eddy current sensor for a rotary shaft according to claim 4, wherein the outer ring portion is opened with a mounting hole for mounting the rotating speed detecting probe, and a detecting end of the rotating speed detecting probe is flush with an end of the housing.

6. The eddy current sensor for a rotary shaft according to claim 1, wherein on a peripheral direction of the housing, a length of an arc between the rotating speed detection probe and a position detecting probe adjacent to a left side of the rotating speed detecting probe is equal to that of an arc between the rotating speed detecting probe and a position detecting probe adjacent to a right side of the rotating speed detecting probe.

7. The eddy current sensor for a rotary shaft according to claim 1, wherein the one or more position detecting probes include one or more radial probes that are provided on the inner ring portion, and wherein detecting ends of the one or more radial probes are oriented perpendicular to an axial direction of the central hole, the radial probes are configured to determine a radial distance between an outer surface of the rotary shaft and the radial probes.

8. The eddy current sensor for a rotary shaft according to claim 7, wherein the outer ring portion is provided with one or more radial holes being in a one-to-one correspondence with the one or more radial probes.

9. The eddy current sensor for a rotary shaft according to claim 1, wherein the one or more position detecting probes comprise one or more axial probes that are provided on the middle portion, and wherein detecting ends of the one or more axial probes are oriented parallel to an axial direction of the central hole, the axial probes are configured to determine a axial distance between an outer surface of the rotary shaft and the axial probes.

10. The eddy current sensor for a rotary shaft according to claim 1, further comprising a compensating probe disposed on the housing, wherein the compensation probe is for detecting impacts of an external environment on the eddy current sensor, the external environment includes at least one of external environment temperature, humidity, and external force deformation, wherein data detected by the position detecting probes or the rotating speed detecting probe is compensated based on the data detected by the compensating probe.

11. A rotary shaft apparatus, comprising a rotary shaft having an eddy current sensor according to claim 1, the housing of the eddy current sensor being disposed around the rotary shaft; one or more rotating speed detection exciting portions being provided on the rotary shaft; the rotating speed detecting probe of the eddy current sensor being provided in correspondence to a revolving plane of the one or more rotating speed detection exciting portions.

12. The rotary shaft apparatus according to claim 11, wherein the one or more rotating speed detection exciting portions is provided on a peripheral outer surface of the rotary shaft, a detecting end of the rotating speed detecting probe being oriented perpendicular to an axial direction of the rotary shaft.

13. The rotary shaft apparatus according to claim 11, wherein the rotary shaft comprises a flange, the one or more rotating speed detection exciting portions being provided on an axial end of the flange, a detecting end of the rotating speed detecting probe being oriented parallel to an axial direction of the rotary shaft.

\* \* \* \* \*